United States Patent [19]

Katsuragi

[11] 4,404,567
[45] Sep. 13, 1983

[54] PRINTING HEAD DRIVE CIRCUIT FOR THERMAL PRINTER

[75] Inventor: Shigeru Katsuragi, Tokyo, Japan

[73] Assignee: Ricoh Company, Ltd., Tokyo, Japan

[21] Appl. No.: 305,428

[22] Filed: Sep. 25, 1981

[30] Foreign Application Priority Data

Oct. 3, 1980 [JP] Japan .................. 55-138280

[51] Int. Cl.³ .................. G01D 15/10; H05B 3/00
[52] U.S. Cl. .................. 346/76 PH; 219/216
[58] Field of Search .................. 346/76 PH; 219/216

[56] References Cited

U.S. PATENT DOCUMENTS 3,874,493  4/1975  Boyd .................. 346/76 PH X
4,113,391  9/1978  Minowa .................. 346/76 PH X
4,168,421  9/1979  Ito .................. 346/76 PH X

*Primary Examiner*—George H. Miller, Jr.

*Attorney, Agent, or Firm*—David G. Alexander

[57] ABSTRACT

A drive circuit for a recording head of a thermogenetic recording apparatus comprises a series connection of a current limiting resistor and a variable resistor. The series connection is connected with a control input terminal of switching circuits adapted to selectively energize a plurality of groups of heat generating elements. A stabilizing power source circuit is connected with the current limiting resistor to maintain the voltage across the current limiting resistor or a current flowing therethrough constant. The current flowing through the series connection is thus kept constant so that a voltage for energizing the heat generating element groups is determined by a resistance of the variable resistor. The element group energizing voltage is controllable by adjusting the resistance of the variable resistor.

6 Claims, 4 Drawing Figures

PRINTING HEAD DRIVE CIRCUIT FOR THERMAL PRINTER

BACKGROUND OF THE INVENTION

The present invention generally relates to thermal printing apparatuses which include heat generating elements arranged in segments or dots in its printing head and records data on a heat-sensitive colorable paper sheet by selectively energizing the heat generating elements in response to input video data. More particularly, the present invention is directed to a drive circuit for a printing head of the type which has a plurality of heat generating elements divided into some groups and reproduces images corresponding to input video signals by selectively supplying the heat generating elements with voltages on a group by group basis.

A known printer of the type described comprises a printing head provided with a plurality of groups of heat generating elements (referred to simply as "element groups" hereinafter). It also comprises a drive circuit for selecting desired ones of the element groups in accordance with input video signals and causes a heat-sensitive paper sheet to color by supplying the selected element groups with voltages. The drive circuit includes switching circuits common in number to the element groups so as to feed the voltages to the individual element groups. The output voltages of the switching circuits remain substantially constant despite any change in a power source voltage due to the presence of a Zener diode at the input side thereof for providing a reference voltage. This ensures uniform voltage distributions to the element groups which in turn allows all the elements in the head to generate constant amounts of heat in a stable manner. Such a known thermal printer is practically usable, but not to a satisfactory degree for the following reasons.

The resistance of heat generating elements differs from one recording head to another. The voltage to be coupled to heat generating elements of a given recording head must be determined to duely match with the resistance of the elements. Hence, it is necessary to choose a Zener diode providing a specific reference voltage for each of printing heads though the latter may resemble each other. Also, when a recording head is replaced with another, the reference voltage needs be changed in conformity with the new recording head. Replacement of a Zener diode for each head or selection of a Zener diode having a desired reference voltage $V_Z$ is quite troublesome and sometimes hardly practicable.

SUMMARY OF THE INVENTION

It is an object of the present invention to provide a printing head drive circuit for a thermal printer which promotes the ease of setting a voltage for energizing heat generating element groups.

It is another object of the present invention to provide a printing head drive circuit for a thermal printer which permits the voltage for energizing heat generating elements to be readily adjusted in the event of replacement of a printing head.

It is another object of the present invention to provide a generally improved drive circuit for heat generating element groups of a thermogenetic recording apparatus.

In order to achieve these objects, a drive circuit embodying the present invention comprises a series connection of a current limiting resistor and a variable resistor, which is connected with a control input terminal of switching circuits adapted to energize heat generating element groups. A constant voltage circuit is connected with the current limiting resistor so that a voltage across said resistor or a current flowing therethrough is maintained constant. This in turn maintains a current flowing through the series connection at a constant value. The voltage coupled to each group of heat generating elements is therefore determined by a resistance of the variable resistor. Consequently, the voltage to each element group can be adjusted to a desired level by controlling the resistance of the variable resistor.

Other objects, together with the foregoing, are attained in the embodiment described in the following description and illustrated in the accompanying drawings.

DESCRIPTION OF THE PREFERRED EMBODIMENTS

While the printing head drive circuit for a thermal printing apparatus of the present invention is susceptible of numerous physical embodiments, depending upon the environment and requirements of use, substantial numbers of the herein shown and described embodiment have been made, tested and used, and all have performed in an eminently satisfactory manner.

Figure 1:
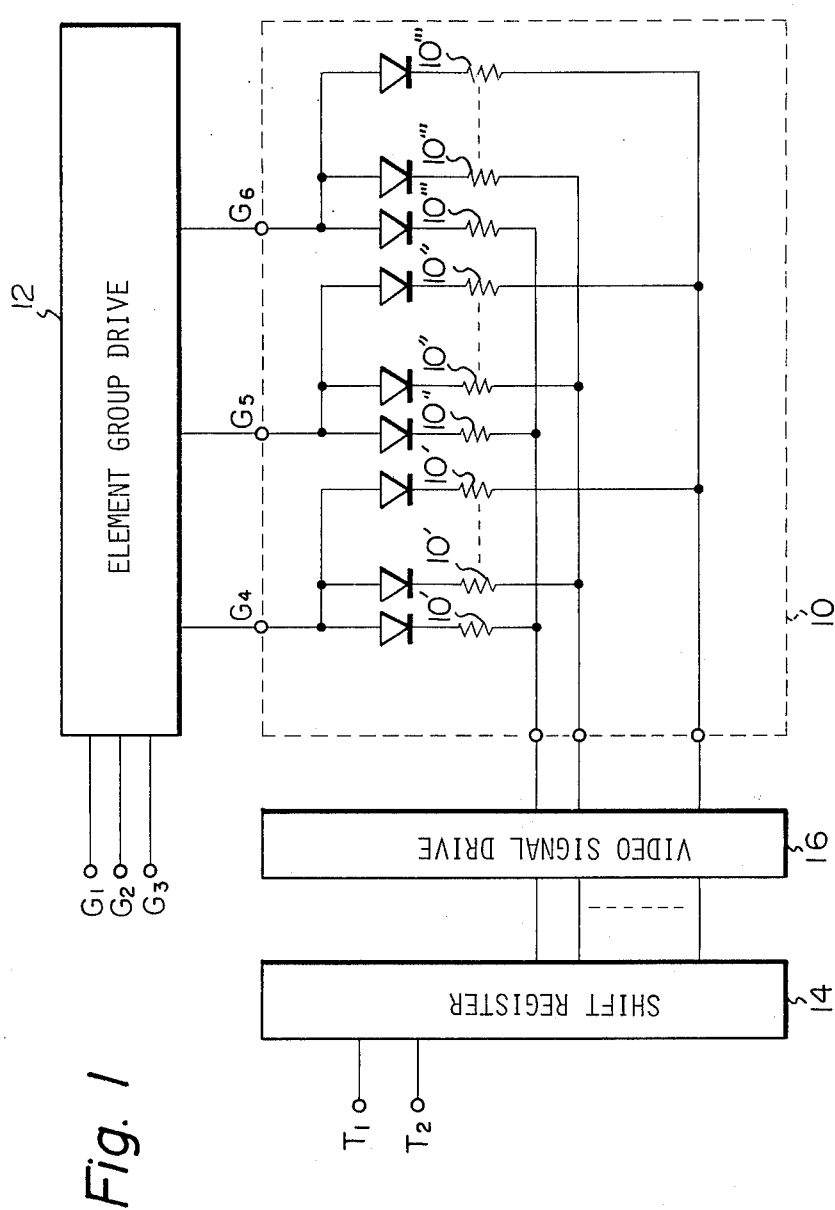
FIG. 1 is a block diagram schematically showing a thermal printing apparatus to which the present invention is applicable.

Referring to FIG. 1 of the drawings, there is shown in a schematic diagram a thermal printer to which the present invention is applicable. The printer includes a printing head 10 in which are arranged a plurality of first group of heat generating elements 10', a plurality of second group of heat generating elements 10'' and a plurality of third group of heat generating elements 10'''. These different groups of heat generating elements 10'–10''' are selectively driven by a drive circuit 12 which is connected therewith as illustrated. The printer further includes a shift register 14 and a video signal drive circuit 16. Video signals supplied to a video signal input $T_1$ are coupled serially to the shift register 14 in synchronism with clock pulses which are supplied to a clock pulse input $T_2$. Parallel outputs of the shift register 14 are delivered to the video signal drive circuit 16. Switching elements (not shown) are included in the video signal drive circuit 14 to be turned on or off by the individual parallel inputs to the circuit 16. Element group selection control signals are sequentially supplied to element group selection control inputs $G_1$, $G_2$, $G_3$ of the printer at timed relation to the transfer of one group of video signals, which consist of video signals corresponding to the number of shift steps in the shift register 14. Said video signals sequentially turn on individual switching elements included in the element group drive circuit 12 as will be described in detail with reference to FIG. 2. These switching elements in turn supply predetermined voltages sequentially to voltage inputs $G_4$, $G_5$, $G_6$ of the printing head 10. The first to third groups of heat generating elements 16'–16''' are connected with the voltage inputs $G_4$–$G_6$, respectively. With this arrangement, heat will be generated by those of the elements 16'–16''' which are impressed with the voltage coupled to the terminal $G_4$, $G_5$ and/or $G_6$ and connected with those switching elements of the video signal drive circuit 16 then turned on.

Figure 2:
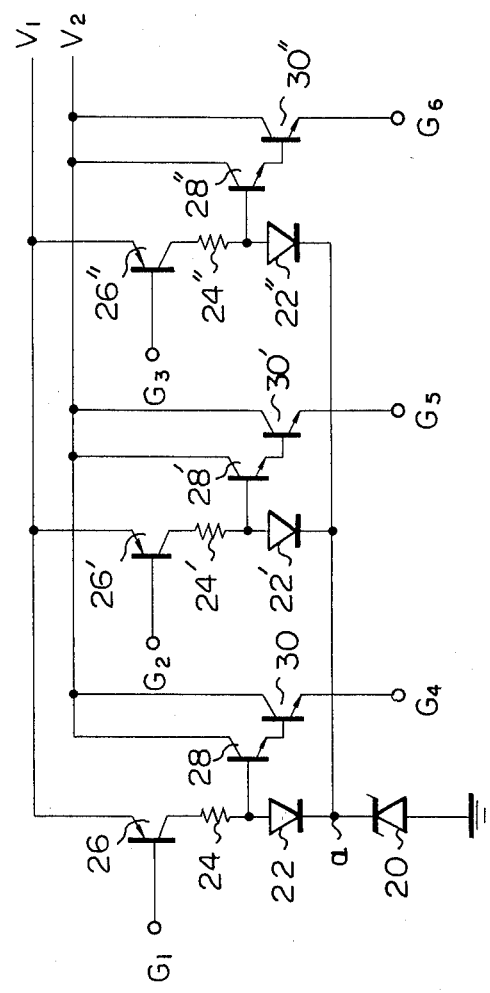
FIG. 2 is a diagram showing a prior art printing head drive circuit for driving heat generating element groups.

FIG. 2 shows an exemplary arrangement of the prior art drive circuit 12 of the printing head 10. The circuit 12 includes a Zener diode 20 providing a given reference voltage, separating diodes 22, 22', 22'', and current limiting resistors 24, 24', 24''. Also included in the circuit 12 are first stage p-n-p transistors 26, 26', 26'' driven by element group selection control signals coupled to the corresponding inputs $G_1$–$G_3$, second stage n-p-n transistors 28, 28', 28'', and third stage n-p-n transistors 30, 30', 30''. The transistors 28 and 30, transistors 28' and 30' and transistors 28'' and 30'' in combination make up the switching connections adapted to supply voltages to the voltage inputs $G_4$, $G_5$, $G_6$ of the head 10, respectively.

When the element group selection control input $G_1$ is grounded (signal="0"), the transistor 26 is rendered conductive so that a breakdown voltage $V_Z$ of the Zener diode 20 appears at the cathode of the diode 22, i.e. junction a. Coupled to the base of the transistor 28 is the sum of the breakdown voltage $V_Z$ and the voltage drop $V_D$ of the diode 22. Accordingly, a difference between the sum voltage $(V_Z+V_D)$ and the base-emitter voltage drop $V_{BE}$ between the transistors 28 and 30, i.e. $(V_Z+V_D)-V_{BE}$, appears at the emitter of the transistor 30. This voltage is fed to the voltage input $G_4$ of the recording head 10. A similar voltage will appear at the voltage input $G_5$ when the element group selection control input $G_2$ is grounded or at the voltage input $G_6$ when the element group selection control input $G_3$ is grounded. In response to the sequential grounding of the inputs $G_1$–$G_3$, the printing head 10 reproduces an image on a heat-sensitive paper sheet corresponding to the input image signals under application of heat.

The voltages supplied to the inputs $G_4$–$G_5$ of the printing head 10 are of a substantially common level, which eliminates uneven voltage distributions to the element groups. Thus, the different groups of elements are energized by the same level of voltage so that the heat generating elements 10'–10''' in the individual groups are supplied with the same voltages to generate the same amounts of heat stably, even though power source voltages $V_1$ and $V_2$ may be varied.

As previously discussed, however, the resistance of heat generating elements differs from one printing head to another. Hence, the voltage to be coupled to a printing head must be selected adequately to match with the resistance of its heat generating elements. This requires the provision of Zener diodes providing different reference voltages $V_Z$ though the recording heads may be similar to each other. After the replacement of a printing head, the reference voltage $V_Z$ has to be determined for a new head. Replacement of the Zener diode for each head or selection of a Zener diode having a desired breakdown voltage $V_Z$ is quite troublesome and sometimes hardly practicable.

Figure 3:
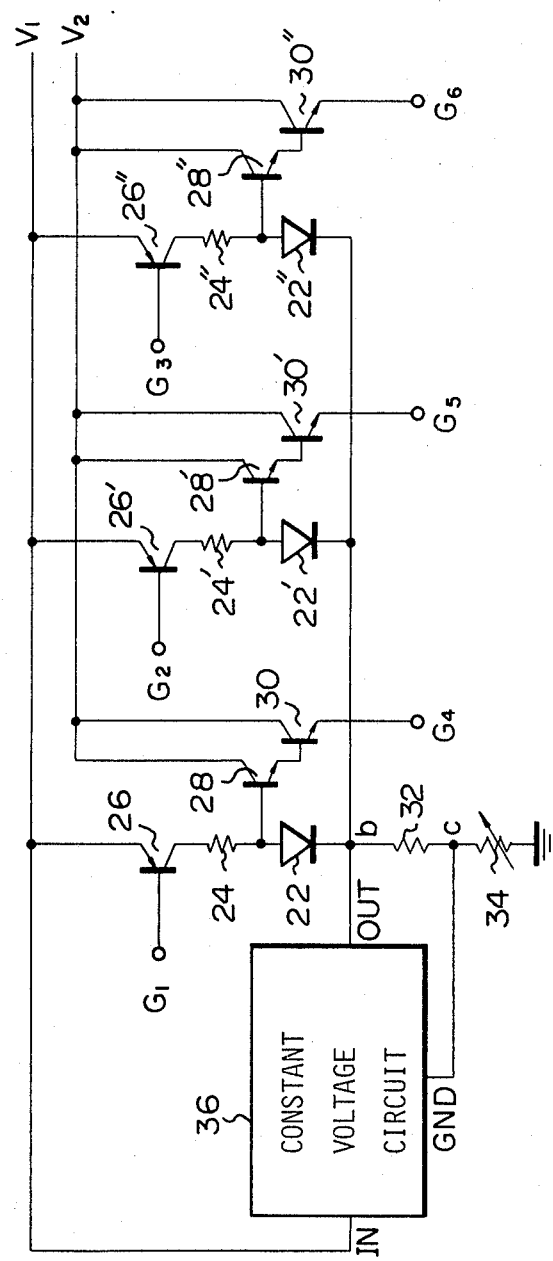
FIG. 3 is a diagram showing a printing head drive circuit embodying the present invention.
Figure 4:
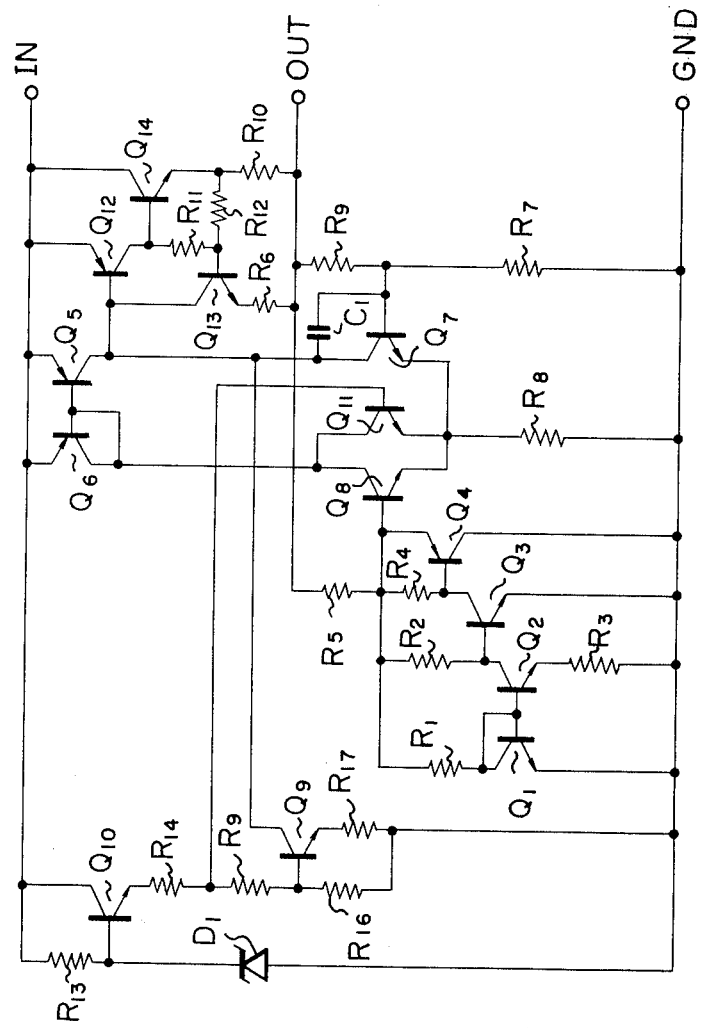
FIG. 4 is a diagram showing an example of a constant voltage circuit included in the drive circuit of FIG. 3.

Reference will now be made to FIGS. 3 and 4 to describe a drive circuit embodying the present invention for driving a printing head of a printer of the type described. The same notations will be employed to designate the same elements as those shown in FIG. 2.

A characteristic feature of the drive circuit shown in FIG. 3 is that the Zener diode 20 of the prior art circuit for providing a reference voltage is omitted and, instead, a series connection of a current limiting resistor 32 and a variable resistor 34 and a constant voltage circuit 36 are additionally included in the circuit. The constant voltage circuit 36 is connected in parallel with the resistor 32.

When a power source voltage $V_1$ is coupled to the constant voltage circuit 36, a predetermined voltage develops across the resistor 32, i.e. across the junction b and c. A given current therefore is permitted to flow through the resistor 32. Then, the current through the resistor 32 and the operating current of the voltage stabilizer 36 flow through the variable resistor 34 causing a voltage to develop at the junction c. As a result, a sum of the voltage at the junction c and the voltage across the junctions b and c is produced at the junction b. Since the operating current of the voltage stabilizer 36 is substantially constant, the voltage appearing at the junction b remains stable. When the element group selection control input $G_1$ is grounded, the base of the transistor 28 develops a sum of the voltage $V_b$ at the junction b and the voltage drop $V_D$ of the diode 22, i.e. $(V_b+V_D)$, while the emitter of the associated transistor 30 develops a voltage differential between the sum $(V_b+V_D)$ and the base-emitter voltage drop $V_{BE}$ between the transistors 28 and 30, i.e. $(V_b+V_D)-V_{BE}$. Such an operation is similar to that of the prior art circuit shown in FIG. 2.

In the production stages, an irregular resistance distribution is unavoidable among different recording heads 10. Choosing only those recording heads having a given resistance as acceptable ones would invite a critical decrease in the yield. The only way to cope with uneven resistances of recording heads is adjusting the voltages to be applied thereto. In the prior art circuit of FIG. 2, the voltage supply to the printing head 10 is adjustable by varying the reference voltage determined by the Zener diode 20. However, Zener diodes matching with different heads 20 need be stocked and selected each time. In other words, a drive circuit associated with a given printing head cannot be replaced with another. This requires replacement of the Zener diode 20 of the drive circuit where it is desired to replace the printing head or the drive circuit, resulting in troublesome maintenance. In contrast, the present invention permits the input voltages to the head 10 to be adjusted with ease through the variable resistor 34. The variable resistor 34 also affords replacability to the head 10 and drive circuit thereby promoting easy maintenance of the printer.

FIG. 4 illustrates an example of the constant voltage circuit 36 included in the drive circuit of FIG. 3. As shown, the constant voltage circuit 36 comprises a diode $D_1$, a capacitor $C_1$, resistors $R_1$–$R_{17}$, transistors $Q_1$–$Q_{14}$, an input terminal IN, an output terminal OUT and a ground terminal GND. It will be apparent that any other type of known voltage stabilizing circuit is applicable to the present invention.

Various modifications will become possible for those skilled in the art after receiving the teachings of the present disclosure without departing from the scope thereof. For example, the drive circuit of FIG. 3 may be supplied with a voltage from a common power source instead of the two different power sources $V_1$ and $V_2$.

What is claimed is:

1. In a thermal printing apparatus comprising thermal printing head means including a plurality of heat generating elements which are energized by a power supply and heat generating elements drive means for selectively driving the heat generating elements in accordance with input data to be recorded on a heat-sensitive paper sheet, the improvement wherein said heat generating element drive means comprises:
 a plurality of switching circuits for selectively energizing the heat generating elements;
 a reference voltage generating circuit for generating a reference voltage which is commonly applied to the heat generating elements; and
 a constant voltage circuit connected between the power supply and the reference voltage generating circuit for maintaining the reference voltage constant.

2. The improvement as claimed in claim 1, wherein the reference voltage generating circuit comprises a series connection of a current limiting resistor and a reference voltage setting resistor, said series connection being connected at control inputs of the switching circuits.

3. The improvement as claimed in claim 2, wherein the reference voltage setting resistor comprises a variable resistor.

4. The improvement as claimed in claim 2, wherein the constant voltage circuit is connected between the power supply and the current limiting resistor to maintain a current flowing through the current limiting resistor constant.

5. The improvement as claimed in claim 1, wherein the heat generating elements are divided into a plurality of heat element groups selectively energized by the switching circuits in accordance with the input data.

6. The improvement as claimed in claim 5, wherein the number of the heat element groups corresponds to that of the switching circuit.

* * * * *